(12) United States Patent
Abolt et al.

(10) Patent No.: US 9,963,391 B2
(45) Date of Patent: May 8, 2018

(54) GYPSUM BASED COMPOSITIONS AND PROCESSES FOR MAKING AND USING SAME

(71) Applicant: Georgia-Pacific Gypsum LLC, Atlanta, GA (US)

(72) Inventors: Scott J. Abolt, Cuba, MO (US); Luke R. Fitzwater, Kalispell, MT (US); John F. Davis, Steelville, MO (US)

(73) Assignee: Georgia-Pacific Gypsum LLC, Atlanta, GA (US)

( * ) Notice: Subject to any disclaimer, the term of this patent is extended or adjusted under 35 U.S.C. 154(b) by 0 days. days.

(21) Appl. No.: 15/459,527

(22) Filed: Mar. 15, 2017

(65) Prior Publication Data

US 2017/0267587 A1    Sep. 21, 2017

Related U.S. Application Data

(60) Provisional application No. 62/309,429, filed on Mar. 16, 2016.

(51) Int. Cl.

| | |
|---|---|
| *C04B 28/14* | (2006.01) |
| *B32B 9/00* | (2006.01) |
| *B32B 9/02* | (2006.01) |
| *C04B 14/18* | (2006.01) |
| *C04B 14/20* | (2006.01) |
| *C04B 14/42* | (2006.01) |
| *C04B 18/24* | (2006.01) |

(Continued)

(52) U.S. Cl.
CPC .............. *C04B 28/14* (2013.01); *B32B 9/005* (2013.01); *B32B 9/02* (2013.01); *C04B 14/185* (2013.01); *C04B 14/202* (2013.01); *C04B 14/42* (2013.01); *C04B 18/241* (2013.01); *C04B 24/383* (2013.01); *E06B 3/7015* (2013.01); *B32B 2419/00* (2013.01); *C04B 2111/0062* (2013.01); *C04B 2111/28* (2013.01); *C04B 2201/20* (2013.01); *E06B 2003/7036* (2013.01); *E06B 2003/7042* (2013.01); *Y02W 30/97* (2015.05)

(58) Field of Classification Search
CPC ......... C04B 28/14; C04B 1/942; E04B 1/942; E04B 2/56; E04B 9/06; E04C 2/02; E04C 2/44

See application file for complete search history.

(56) References Cited

U.S. PATENT DOCUMENTS 3,616,173 A * 10/1971 Green ................. E04B 1/94
106/711
4,343,127 A * 8/1982 Greve ................. C04B 26/04
428/698

(Continued)

*Primary Examiner* — Babajide A Demuren
(74) *Attorney, Agent, or Firm* — Ram W. Sabnis

(57) ABSTRACT

Gypsum based compositions, processes for making same, and articles made therefrom. In one example, the gypsum based composition can include about 1.5 wt % to about 3 wt % of a starch, about 11 wt % to about 14 wt % of a paper, about 0.7 wt % to about 2.3 wt % of vermiculite, about 1.3 wt % to about 3 wt % of a plurality of reinforcing fibers, about 7 wt % to about 10 wt % of a binding agent, about 2 wt % to about 4 wt % of perlite, and about 65 wt % to about 75 wt % of a calcium sulfate, where all weight percent values are based on a combined weight of the starch, paper, vermiculite, plurality of reinforcing fibers, binding agent, perlite, and calcium sulfate.

20 Claims, 1 Drawing Sheet

(51) Int. Cl.
 *C04B 24/38* (2006.01)
 *E06B 3/70* (2006.01)
 *C04B 111/00* (2006.01)
 *C04B 111/28* (2006.01)

(56) References Cited

U.S. PATENT DOCUMENTS

| | | | | |
|---|---|---|---|---|
| 5,256,222 A * | 10/1993 | Shepherd | | B28B 3/123 |
| | | | | 106/631 |
| 5,558,710 A * | 9/1996 | Baig | | C04B 18/021 |
| | | | | 106/122 |
| 6,251,979 B1 * | 6/2001 | Luongo | | B28B 11/24 |
| | | | | 524/423 |
| 6,319,312 B1 * | 11/2001 | Luongo | | C04B 14/18 |
| | | | | 106/672 |
| 6,699,426 B1 * | 3/2004 | Burke | | B28B 3/20 |
| | | | | 264/177.2 |
| 7,364,015 B2 * | 4/2008 | Englert | | B28B 5/027 |
| | | | | 156/39 |
| 8,221,542 B2 * | 7/2012 | Francis | | C04B 28/14 |
| | | | | 106/772 |
| 8,323,785 B2 * | 12/2012 | Yu | | C04B 20/06 |
| | | | | 106/772 |
| 9,169,426 B2 * | 10/2015 | Negri | | C08L 67/08 |
| 2003/0084980 A1 * | 5/2003 | Seufert | | C04B 24/383 |
| | | | | 156/39 |
| 2005/0241541 A1 * | 11/2005 | Hohn | | B63H 3/008 |
| | | | | 106/805 |
| 2006/0036012 A1 * | 2/2006 | Hayes | | B32B 27/20 |
| | | | | 524/445 |
| 2008/0057318 A1 * | 3/2008 | Adzima | | B32B 13/14 |
| | | | | 428/426 |
| 2011/0192520 A1 * | 8/2011 | Rigaudon | | C04B 24/383 |
| | | | | 156/45 |
| 2012/0322902 A1 * | 12/2012 | Berke | | C04B 28/04 |
| | | | | 521/83 |

* cited by examiner

GYPSUM BASED COMPOSITIONS AND PROCESSES FOR MAKING AND USING SAME

CROSS-REFERENCE TO RELATED APPLICATION

This application claims priority to U.S. Provisional Patent Application No. 62/309,429, filed on Mar. 16, 2016, which is incorporated by reference herein.

BACKGROUND

Field

Embodiments described generally relate to low density mineral compositions and processes for making and using same. More particularly, such embodiments relate to gypsum based compositions and processes for making and using same.

Description of the Related Art

Gypsum based composites have fire resistant properties that make them desirable for construction materials. Accordingly, panels and boards made from gypsum based composites are typically used for the construction of walls, doors, ceilings, and other construction applications.

To be considered a 90-minute fire resistant door, the door must meet the 90-minute fire rating, as measured according to the Underwriters Laboratories Method (UL) 10C, "Positive Pressure Fire Test for Door Assemblies" (2009), hereafter "UL 10C (2009)". Conventional gypsum based panels and boards can be formulated to meet this fire rating requirement, but lack the requisite strength properties for use as a door. It has been known to "block" gypsum panels to compensate for the lack of strength, but blocking requires a significant increase in manufacturing time because the door core must be assembled from multiple pieces of material instead of just one. Blocking means to remove portions of the gypsum based panel that will form the door core and replacing those removed portions with a material having greater strength. Portions of the door panel most often blocked are areas that receive door handles, hinges, kick plates, and other things that direct high mechanical stresses on the door during use.

There is a need, therefore, for improved gypsum based compositions and panels or boards made therefrom having greater strength so as to not require blocking when used as a door core in a fire resistant door.

SUMMARY

Gypsum based compositions, processes for making same, and articles made therefrom are provided. In some examples, the gypsum based composition can include about 1.5 wt % to about 3 wt % of a starch, about 11 wt % to about 14 wt % of a paper, about 0.7 wt % to about 2.3 wt % of vermiculite, about 1.3 wt % to about 3 wt % of a plurality of reinforcing fibers, about 7 wt % to about 10 wt % of a binding agent, about 2 wt % to about 4 wt % of perlite, and about 65 wt % to about 75 wt % of a calcium sulfate, where all weight percent values are based on a combined weight of the starch, paper, vermiculite, plurality of reinforcing fibers, binding agent, perlite, and calcium sulfate.

In some examples, the process for making the gypsum based composition can include mixing a starch, a paper, vermiculite, a plurality of reinforcing fibers, a binding agent, perlite, a calcium sulfate, and water to produce an aqueous mixture. The aqueous mixture can include about 0.5 wt % to about 1 wt % of the starch, about 2.5 wt % to about 5.5 wt % of the paper, about 0.2 wt % to about 0.8 wt % of the vermiculite, about 0.4 wt % to about 1 wt % of the reinforcing fibers, about 2 wt % to about 3.3 wt % of the binding agent, about 0.5 wt % to about 1.5 wt % of the perlite, about 12 wt % to about 25 wt % of the calcium sulfate, and about 60 wt % to about 80 wt % of the water, where all weight percent values are based on a combined weight of the starch, paper, vermiculite, reinforcing fibers, calcium sulfate, perlite, binding agent, and water. The method can also include curing the aqueous mixture to produce the gypsum based composition. In some examples, the aqueous mixture can be cured by drying the aqueous mixture.

In some examples, an article made from the gypsum based composition can include a laminated structure. The laminated structure can include a first facing layer, a second facing layer, and a core disposed between the first facing layer and the second facing layer. The core can be or include the gypsum based composition. In some examples, the laminated structure can be a fire door without blocking that is rated for at least 90 minutes, as measured according to UL 10C (2009).

DETAILED DESCRIPTION

Figure 1:
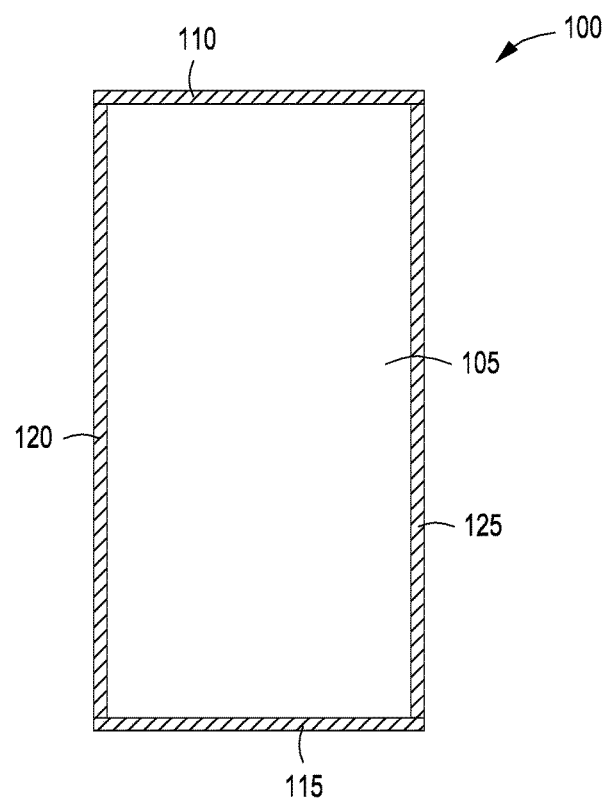
FIG. 1 depicts an illustrative banded core made from a gypsum based composition, according to one or more embodiments described.

A gypsum based building composition or material having excellent fire resistance and strength is provided. As used herein, the term "gypsum based building composition" or "gypsum based composition" refers to an aqueous mixture or slurry that has been cured or set. The aqueous mixture or slurry can include, but is not limited to, one more starches, one or more papers, vermiculite, one or more reinforcing fibers, one or more binding agents, perlite, one or more calcium sulfates (e.g., anhydrous calcium sulfate ("anhydrite"), calcium sulfate hemihydrate, calcium sulfate dihydrate ("gypsum"), or any mixture thereof), and water. In at least one example the calcium sulfate can be or include anhydrous calcium sulfate, calcium sulfate hemihydrate, or a mixture thereof. The aqueous mixture can be cured or set by drying the aqueous mixture. When the aqueous mixture is cured or set, the anhydrous calcium sulfate and/or the calcium sulfate hemihydrate can react with the water to produce calcium sulfate hemihydrate and/or calcium sulfate dihydrate. As the calcium sulfate dihydrate and/or calcium sulfate hemihydrate forms when the aqueous mixture is cured or set, the composition can become rigid or hard. The aqueous mixture can be molded, compressed, or otherwise formed into any desired shape and the shaped aqueous mixture can be cured or set by drying the shaped aqueous mixture under conditions sufficient to produce the gypsum based composition having the desired shape. For example, the aqueous mixture can be formed into a panel or board and dried to produce the gypsum based composition in the form of a panel or board.

The gypsum based composition can be used for numerous applications, some of which can include, but are not limited to, building products such as cores, rails, stiles, and blocking material in the manufacture of fire resistant doors. As used herein, the term "blocking" generally refers to the use of one or more pieces of a material that is different from the main component of a door core that forms part of the core and provides increased structural support or strength to the main component of the core. For example, blocking can be used to replace the main component of a door core at attachment sites intended for door knobs and/or hinges, at attachment sites intended for kick plates, push plates, or the like, and/or in other locations that can help brace against lateral-torsion buckling. It should be noted that if a core includes blocking the core is a multi-piece or multi-component core that requires significantly more assembly time as compared to a core that does not include any blocking. In some examples door cores can be manufactured with only the gypsum based composition, i.e., the door core can be a monolithic structure made entirely of the gypsum based composition. In other examples, the gypsum based building material can be used as a blocking material for other gypsum based construction materials or non-gypsum based construction materials. Rails and stiles that are often used in the manufacture of banded cores can also be made of the gypsum based building material.

It has been surprisingly and unexpectedly discovered that the gypsum based composition can be used as a core in a fire resistant door, generally referred to as a "fire door", which meets or exceeds the requirements of the 90-minute fire rating, as measured according to UL 10C (2009). It has also been surprisingly and unexpectedly discovered that fire doors that include a core made from the gypsum based composition can have a fire rating of at least 90 minutes, as measured according to UL 10C (2009), without any blocking. Without wishing to be bound by theory, it is believed the gypsum based composition can also be used as a core in a fire door that meets or exceeds the requirements of the 120-minute fire rating, as measured according to the British Standards Institution "Fire tests on building materials and structures" BS-476-22:1987 incorporating Corrigendum No. 1, hereafter "BS-476-22:1987". Also without wishing to be bound by theory, it is believed that fire doors that include a core made from the gypsum based composition can have a fire rating of at least 120 minutes, as measured according to BS-476-22:1987, without any blocking.

The gypsum based composition can include about 1.3 wt %, about 1.5 wt %, about 1.7 wt %, about 2 wt %, or about 2.2 wt % to about 2.4% about 2.6 wt %, about 2.7 wt %, about 3 wt %, or about 3.2 wt % of the starch, based on the combined weight of the starch, paper, vermiculite, plurality of reinforcing fibers, binding agent, perlite, and calcium sulfate. The gypsum based composition can include about 10 wt %, about 11 wt %, about 11.5 wt %, about 12 wt %, or about 12.3 w % to about 12.7 wt %, about 13 wt %, about 13.5 wt %, about 14 wt %, about 14.5 wt %, or about 15 wt % of the paper, based on the combined weight of the starch, paper, vermiculite, plurality of reinforcing fibers, binding agent, perlite, and calcium sulfate. The gypsum based composition can include about 0.6 wt %, about 0.7 wt %, about 0.9 wt %, about 1.2 wt %, or about 1.4 wt % to about 1.6 wt %, about 1.8 wt %, about 2 wt %, about 2.3 wt %, or about 2.5 wt % of the vermiculite, based on the combined weight of the starch, paper, vermiculite, plurality of reinforcing fibers, binding agent, perlite, and calcium sulfate. The gypsum based composition can include about 1.1 wt %, about 1.3 wt %, about 1.5 wt %, about 1.7 wt %, or about 2 wt % to about 2.2 wt %, about 2.4 wt %, about 2.7 wt %, about 3 wt %, or about 3.2 wt % of the plurality of reinforcing fibers, based on the combined weight of the starch, paper, vermiculite, plurality of reinforcing fibers, binding agent, perlite, and calcium sulfate. The gypsum based composition can include about 6 wt %, about 7 wt %, about 7.5 wt % about 8 wt %, or about 8.3 wt % to about 8.7 wt %, about 9 wt %, about 9.5 wt %, about 10 wt %, about 10.5 wt %, or about 11 wt % of the binding agent, based on the combined weight of the starch, paper, vermiculite, plurality of reinforcing fibers, binding agent, perlite, and calcium sulfate. The gypsum based composition can include about 1.7 wt %, about 2 wt %, about 2.3 wt %, about 2.6 wt %, or about 2.9 wt % to about 3.2 wt %, about 3.5 wt %, about 3.7 wt %, about 4 wt %, or about 4.3 wt % of the perlite, based on the combined weight of the starch, paper, vermiculite, plurality of reinforcing fibers, binding agent, perlite, and calcium sulfate. The gypsum based composition can include about 58 wt %, about 60 wt %, about 63 wt %, about 65 wt %, about 67 wt %, or about 69 wt % to about 71 wt %, about 73 wt %, about 75 wt %, about 77 wt %, about 80 wt %, or about 82 wt % of the calcium sulfate, based on the combined weight of the starch, paper, vermiculite, plurality of reinforcing fibers, binding agent, perlite, and calcium sulfate.

In some examples, the gypsum based composition can include about 1.5 wt % to about 3 wt % of the starch, about 11 wt % to about 14 wt % of the paper, about 0.7 wt % to about 2.3 wt % of the vermiculite, about 1.3 wt % to about 3 wt % of the plurality of reinforcing fibers, about 7 wt % to about 10 wt % of the binding agent, about 2 wt % to about 4 wt % of the perlite, and about 65 wt % to about 75 wt % of the calcium sulfate, based on the combined weight of the starch, paper, vermiculite, plurality of reinforcing fibers, binding agent, perlite, and calcium sulfate. In other example, the gypsum based composition can include about 2 wt % to about 2.6 wt % of the starch, about 12 wt % to about 13 wt % of the paper, about 1.2 wt % to about 1.8 wt % of the vermiculite, about 1.8 wt % to about 2.4 wt % of the plurality of reinforcing fibers, about 8 wt % to about 9 wt % of the binding agent, about 2.5 wt % to about 3.5 wt % of the perlite, and about 67 wt % to about 73 wt % of the calcium sulfate, based on the combined weight of the starch, paper, vermiculite, plurality of reinforcing fibers, binding agent, perlite, and calcium sulfate.

In some examples, the gypsum based composition can be free of any water that is not chemically bound to one or more of the components in the aqueous mixture, e.g., the calcium sulfate. In one example, if the gypsum based composition includes water, i.e., free water that is not chemically bound to one or more of the components in the aqueous mixture, the gypsum based composition can include about 1.5 wt % to about 3 wt % of the starch, about 11 wt % to about 14 wt % of the paper, about 0.7 wt % to about 2.3 wt % of the vermiculite, about 1.3 wt % to about 3 wt % of the reinforcing fibers, about 7 wt % to about 10 wt % of the binding agent, about 2 wt % to about 4 wt % of the perlite, about 65 wt % to about 75 wt % of the calcium sulfate, and less than 2 wt %, less than 1.7 wt %, less than 1.5 wt %, less than 1.3 wt %, less than 1 wt %, less than 0.7 wt %, less than 0.5 wt %, less than 0.3 wt %, or less than 0.1 wt % of free water, based on the combined weight of the starch, paper, vermiculite, glass fibers, binding agent, perlite, calcium sulfate, and free water. In another example, if the gypsum based composition includes free water, the gypsum based composition can include about 2 wt % to about 2.6 wt % of the starch, about 12 wt % to about 13 wt % of the paper, about 1 wt % to about 2 wt % of the vermiculite, about 1.8 wt % to about 2.4 wt % of the glass fibers, about 8 wt % to about 9 wt % of the binding agent, about 2.5 wt % to about 3.5 wt % of the perlite, about 68 wt % to about 72 wt % of the calcium sulfate, and less than 2 wt %, less than 1.7 wt %, less than 1.5 wt %, less than 1.3 wt %, less than 1 wt %, less than 0.7 wt %, less than 0.5 wt %, less than 0.3 wt %, or less than 0.1 wt % of free water, based on the combined weight of the starch, paper, vermiculite, glass fibers, binding agent, perlite, calcium sulfate, and free water.

The gypsum based composition can have a density of about 0.7 g/cm$^3$, about 0.8 g/cm$^3$, about 0.85 g/cm$^3$, or about 0.88 g/cm$^3$ to about 0.91 g/cm$^3$, about 0.96 g/cm$^3$, or about 1 g/cm$^3$, as measured according to ASTM D1037-12. In one example, the gypsum based composition can have a minimum density of 0.82 g/cm$^3$, 0.85 g/cm$^3$, or 0.88 g/cm$^3$ to about 0.90 g/cm$^3$, about 0.95 g/cm$^3$, or about 1 g/cm$^3$, as measured according to ASTM D1037-12. In another example, the gypsum based composition can have a density of about 0.7 g/cm$^3$, about 0.75 g/cm$^3$, about 0.8 g/cm$^3$, or about 0.85 g/cm$^3$ to less than 0.88 g/cm$^3$, less than 0.9 g/cm$^3$, less than 0.93 g/cm$^3$, less than 0.95 g/cm$^3$, less than 0.97 g/cm$^3$, or less than 1 g/cm$^3$.

The gypsum based composition, in the form of a panel or board, can have a face screw holding strength of about 2,400 newtons (N), about 2,450 N, or about 2,500 N to about 2,550 N, about 2,600 N, about 2,700 N, or about 2,800 N, as measured according to WDMA T.M. 10-14. The gypsum based composition, in the form of a panel or board, can have a hinge-loading of about 2,400 N, about 2,450 N, about 2,500 N, or about 2,600 N to about 2,800 N, about 3,000 N, about 3,300 N, or about 3,600 N, as measured according to WDMA T.M. 8-14. The gypsum based composition, in the form of a panel or board, can have a vertical door edge screw holding of about 2,400 N, about 2,450 N, about 2,500 N, or about 2,600 N to about 2,800 N, about 3,000 N, about 3,300 N, or about 3,600 N, as measured according to WDMA T.M. 10-14. The gypsum based composition, in the form of a panel or board, can have a horizontal door edge screw holding of about 1,300 N, about 1,330 N, about 1,365 N, or about 1,400 N to about 1,430 N, about 1,450 N, about 1,500 N, about 1,900 N, about 2,300 N, or about 2,700 N, as measured according to WDMA T.M. 10-14. The gypsum based composition, in the form of a panel or board, can have an internal bond strength of about 225 kPa, about 250 kPa, about 275 kPa, or about 300 kPa to about 325 kPa, about 350 kPa, or about 375 kPa, as measured according to ASTM D1037-12. The gypsum based composition, in the form of a panel or board, can have a modulus of rupture of about 1.6 MPa, about 1.8 MPa, or about 2 MPa to about 2.2 MPa, about 2.4 MPa, or about 2.6 MPa, as measured according to ASTM D1037-12. The gypsum based composition can be used to manufacture doors, e.g., fire resistant doors, which can be classified as extra heavy duty, with or without blocking, as determined according to WDMA I.S. 1-A-14.

In one example, the gypsum based composition, in the form of a panel or board, can have at least two, at least three, at least four, or all of the following physical properties: a density of about 0.8 g/cm$^3$ to about 0.9 g/cm$^3$, a face screw holding strength of about 2,450 N to about 2,800 N, a hinge-loading of about 2,450 N to about 3,600 N, a vertical door edge screw holding of about 2,450 N to about 3,600 N, a horizontal door edge screw holding of about 1,330 N to about 2,700 N. In some examples, the gypsum based composition, in the form of a panel or board can have a minimum face screw holding strength of at least 2,450 N, as measured according to WDMA T.M. 10-14. In some examples, the gypsum based composition, in the form of a panel or board can have a minimum hinge-loading of 2,450 N, as measured according to WDMA T.M. 10-14. In some examples, the gypsum based composition, in the form of a panel or board can have a minimum vertical door edge screw holding of 2,450 N, as measured according to WDMA T.M. 10-14. In some examples, the gypsum based composition, in the form of a panel or board can have a minimum horizontal door edge screw holding of 1,330 N, as measured according to WDMA T.M. 10-14.

The starch can include any suitable starch or mixture of starches. Illustrative sources of starch can include, but are not limited to, maize or corn, wheat, rice, potato, tapioca, barley, sorghum, or any mixture thereof. The starch can be a waxy starch, e.g., waxy maize or corn. Generally, waxy starches are starches that include at least 95 wt % amylopectin. Other starches such as genetically engineered starches can include high amylose potato starches and potato amylopectin starches. The starch can be non-pregelatinized starch, e.g., non-pregelatinized starch from sorghum and/or corn. For example, the starch can be a corn starch, such as a ground corn based starch. The starch can be non-pregelatinized acid-modified starch, e.g., non-pregelatinized acid modified starch from sorghum and/or corn. Any suitable acid can be used to modify the starch. The starch can be pregelatinized starch, e.g., pre-gelatinized starch from sorghum and/or corn. The starch can be pregelatinized acid-modified starch, e.g., pregelatinized acid modified starch from sorghum and/or corn. Pregelatinized starch can also be referred to as cold-swelling starch and has been chemically and/or mechanically processed to rupture all or part of the starch granules. An illustrate acid that can be used to modify the starch can include, but is not limited to, hydrochloric acid, such as 22 degrees Baume hydrochloric acid. In contrast to native or raw starch, a pregelatinized starch is generally soluble in cold water or at least can readily form dispersions, pastes, or gels with cold water, depending, at least in part, on the concentration of the pregelatinized starch used and on the type of starch used to produce the pre-gelatinized starch.

Suitable starches also can include chemically modified or derivatized starches, such as by etherification, esterification, acid hydrolysis, dextrinization, crosslinking, cationization, heat-treatment, and/or enzyme treatment, e.g., with alpha-amylase, beta-amylase, pullulanase, isoamylase, and/or glucoamylase. Illustrative chemically modified starches can include, but are not limited to, hydroxyalkylated starches, e.g., a hydroxypropylated starch and/or a hydroxyethylated starch, and/or succinated starches, e.g., an octenylsuccinated starch and/or a dodecylsuccinated starch. Low amylose starches, i.e., starches that contain less than 40 wt % of amylose, also can be used. One commercially available chemically modified starch can be a hydroxypropylated starch available from the National Starch and Chemical Company. One commercially available starch can include the non-pre-gelatinized acid modified starch sold under the trade name LC-211, available from Archer Daniels Midland Company. Another commercially available starch can include the wallboard binders (WBB), available from Tate and Lyle.

The paper can include any suitable paper or mixture of papers. The paper can be derived from virgin paper stock or previously used, e.g., waste, paper stock. Suitable sources the paper component can be derived from, can include, but are not limited to, wood, cotton, flax, straw, or any mixture thereof. The paper can be a product of the sulfite process, the sulfate (kraft paper) process, and/or other processes. Illustrative papers can include, but are not limited to, virgin and brown kraft papers, e.g., newsprint. In at least one example, the paper can be or include post-industrial blank recycled newsprint. In at least one example, the paper can be or include lignocellulosic fibers prepared for making paper, but not actually made into paper. As such, the paper component can be in the form of individual or discrete fibers that are not in the form of paper.

The vermiculite can be raw, i.e., unexpanded vermiculate. Unexpanded vermiculite can swell or expand when heated. When a fire resistant door that includes the gypsum based composition as the core is exposed to a fire, the unexpanded vermiculite can swell or otherwise expand, which can help reduce or otherwise control shrinkage and/or cracking of the gypsum based composition. The unexpanded vermiculite can have a density of about 0.9 g/cm$^3$, about 1 g/cm$^3$, or about 1.05 g/cm$^3$ to about 1.1 g/cm$^3$, about 1.15 g/cm, or about 1.2 g/cm$^3$. The unexpanded vermiculite can have a particle size of about 1,000 µm or less, about 900 µm or less, about 850 µm or less, about 800 µm or less, about 750 µm or less, or about 700 µm or less.

The reinforcing fibers can include any suitable fiber or mixture of fibers. Illustrative reinforcing fibers can include, but are not limited to, glass fibers, carbon fibers, mineral fibers, or any mixture thereof. The reinforcing fibers can have an average length of about 0.25 cm, about 0.5 cm, or about 1 cm to about 1.25 cm, about 1.5 cm, or about 2 cm. An illustrative commercially available source of glass fibers can include, but is not limited to, 973 Multi-End Roving, available from Owens Corning. In should be noted that the paper component includes paper fibers that are different than the reinforcing fibers. For purposes of this disclosure, paper or lignocellulosic fibers will be considered and referred to as "paper" and other fibrous materials, e.g., glass fibers, carbon fibers, and mineral fibers, will be referred to as "reinforcing fibers".

The binding agent can include any suitable binding agent or mixture of binding agents. The binding agent can improve the hose stream performance of the gypsum based composition when subjected to the UL 10C (2009) test. Illustrative binding agents can include, but are not limited to, gypsum, fly ash, sodium silicate, cement, or any mixture thereof. The fly ash can be recovered, for example, from a pulverized coal combustion boiler. The fly ash can be composed of non-carbon compounds. For example, the composition of the fly ash can include, but is not limited to, silicon dioxide, calcium oxide, magnesium oxide, aluminum oxide, iron oxide, or any mixture thereof. The cement can be or include, but is not limited to, one or more hydraulic cements, one or more quick set cements, or any mixture thereof. In at least one example, the cement can be or include Portland cement. In at least one other example, the binding agent can be or include gypsum. It should be noted that if the binding agent includes gypsum, the gypsum in the binding agent is separate and distinct from any gypsum contained in the calcium sulfate component of the aqueous mixture and the gypsum based building material.

Portland cement represents a class of hydraulic cements that can include a substantial quantity of calcium silicate with only minor quantities of aluminates, i.e., tricalcium aluminate and a calcium aluminoferrite. Portland cements can be produced by heating, to incipient fusion, an intimate mixture of calcareous and argillaceous, or other siliceous, aluminious, and/or iron-oxide-bearing materials so as to form a clinker. The clinker can be pulverized and a small amount of calcium sulfate, e.g., gypsum, can be added to improve the setting characteristics of the finished cement. Portland cements can be characterized by type in accordance with well-known standards developed by the American Portland Cement Association, which include Types I, IA, II, IIA, I/II, III, IIIA, IV and V. The binding agent can include any one or more of these types of Portland cement. In at least one example, the binding agent can be or include Portland cement Type III.

The perlite can be expanded perlite. Expanded perlite can be produced by heating moisture-containing, natural-occurring perlite ore to a temperature of about 800° C. to about 1,100° C. The heat can cause the perlite ore to explode or otherwise expand in size to about 15 to about 20 times its original volume. The expanded perlite can have a density of about 0.03 g/cm$^3$, about 0.06 g/cm$^3$, or about 0.08 g/cm$^3$ to about 0.1 g/cm$^3$, about 0.15 g/cm$^3$, or about 0.18 g/cm$^3$. The expanded perlite can have a particle size of about 500 µm or less, about 400 µm or less, about 300 µm or less, about 200 µm or less, about 100 µm or less, about 75 µm or less, or about 50 µm or less. Suitable, commercially available, expanded perlite is generally referred to as cryogenic plaster and cryogenic concrete aggregate.

The calcium sulfate can include calcium sulfate dihydrate ($CaSO_4(H_2O)_2$), calcium sulfate hemihydrate ($CaSO_4(H_2O)_{0.5}$), anhydrous calcium sulfate ($CaSO_4$), or any mixture thereof. The calcium sulfate can be derived from natural rock and/or synthetically made. If the calcium sulfate is calcium sulfate hemihydrate, alpha-calcium sulfate hemihydrate and/or beta-calcium sulfate hemihydrate can be used. The calcium sulfate can be in powdered form. For example, the calcium sulfate can have an average particle size of about 1 µm, about 25 µm, about 35µ, or about 44 µm to about 60 µm, about 74 µm, about 80 µm, or about 100 µm. In one example, the calcium sulfate can be in the form of calcium sulfate hemihydrate. The calcium sulfate can be or include gypsum. One suitable calcium sulfate that is commercially available includes DENSCAL® BR-707, available from Georgia-Pacific Gypsum LLC.

In one or more examples, the gypsum composition can optionally include one or more additives. An illustrative additive can include, but is not limited to, one or more retarders. The retarders can retard or otherwise slow the set time of an aqueous mixture from which the gypsum based composition can be prepared. An exemplary retarder can be or include, but is not limited to, sodium citrate. The aqueous mixture can include the retarder in an amount of about 0.05 wt %, about 0.08 wt %, about 0.1 wt %, or about 0.2 wt % to about 0.3 wt %, about 0.4 wt %, or about 0.5 wt %, based on the combined weight of the starch, paper, vermiculite, reinforcing fibers, calcium sulfate, perlite, binding agent, and water.

As noted above, the gypsum based composition can be prepared by drying the aqueous mixture or slurry that includes the starch, paper, vermiculite, plurality of reinforcing fibers, binding agent, perlite, and calcium sulfate. The aqueous mixture or slurry can include about 0.5 wt %, about 0.6 wt %, or about 0.7 wt % to about 0.8 wt %, about 0.9 wt %, or about 1 wt % of the starch, based on a combined weight of the starch, paper, vermiculite, reinforcing fibers, calcium sulfate, perlite, binding agent, and water. The aqueous mixture or slurry can include about 2.5 wt %, about 3 wt %, or about 3.5 wt % to about 4.5 wt %, about 5 wt %, or about 5.5 wt % of the paper, based on a combined weight of the starch, paper, vermiculite, reinforcing fibers, calcium sulfate, perlite, binding agent, and water. The aqueous mixture or slurry can include about 0.2 wt %, about 0.3 wt %, or about 0.4 wt % to about 0.6 wt %, about 0.7 wt %, or about 0.8 wt % of the vermiculite, based on a combined weight of the starch, paper, vermiculite, reinforcing fibers, calcium sulfate, perlite, binding agent, and water. The aqueous mixture or slurry can include about 0.4 wt %, about 0.5 wt %, or about 0.6 wt % to about 0.8 wt %, about 0.9 wt %, or about 1 wt % of the reinforcing fibers, based on a combined weight of the starch, paper, vermiculite, reinforcing fibers, calcium sulfate, perlite, binding agent, and water. The aqueous slurry or mixture can include about 12 wt %, about 15 wt %, or about 17 wt % to about 20 wt %, about 22 wt %, or about 25 wt % of the calcium sulfate, based on a combined weight of the starch, paper, vermiculite, reinforcing fibers, calcium sulfate, perlite, binding agent, and water. The aqueous mixture or slurry can include about 0.5 wt %, about 0.7 wt %, or about 0.9 wt % to about 1.1 wt %, about 1.3 wt %, or about 1.5 wt % of the perlite, based on a combined weight of the starch, paper, vermiculite, reinforcing fibers, calcium sulfate, perlite, binding agent, and water. The aqueous mixture or slurry can include about 2 wt %, about 2.3 wt %, or about 2.5 wt % to about 2.8 wt %, about 3 wt %, or about 3.3 wt % of the binding agent, based on a combined weight of the starch, paper, vermiculite, reinforcing fibers, calcium sulfate, perlite, binding agent, and water. The aqueous mixture or slurry can include about 60 wt %, about 65 wt %, or about 67 wt % to about 73 wt %, about 75 wt %, or about 80 wt % of water, based on a combined weight of the starch, paper, vermiculite, reinforcing fibers, calcium sulfate, perlite, binding agent, and water.

In one example, the aqueous mixture or slurry can include about 0.5 wt % to about 1 wt % of the starch, about 2.5 wt % to about 5.5 wt % of the paper, about 0.2 wt % to about 0.8 wt % of the vermiculite, about 0.4 wt % to about 1 wt % of the reinforcing fibers, about 12 wt % to about 25 wt % of the calcium sulfate, about 0.5 wt % to about 1.5 wt % of the perlite, about 2 wt % to about 3.3 wt % of the binding agent, and about 60 wt % to about 80 wt % of the water, based on the combined weight of the starch, paper, vermiculite, reinforcing fibers, calcium sulfate, perlite, binding agent, and water. In another example, the aqueous mixture or slurry can include about 0.65 wt % to about 0.85 wt % of the starch, about 3.8 wt % to about 4.2 wt % of the paper, about 0.4 wt % to about 0.6 wt % of the vermiculite, about 0.6 wt % to about 0.8 wt % of the reinforcing fibers, about 17 wt % to about 21 wt % of the calcium sulfate, about 0.9 wt % to about 1.1 wt % of the perlite, about 2.6 wt % to about 3 wt % of the binding agent, and about 67 wt % to about 75 wt % of the water, based on the combined weight of the starch, paper, vermiculite, reinforcing fibers, calcium sulfate, perlite, binding agent, and water.

On a dry basis, i.e., without accounting for the water, the aqueous mixture, prior to curing, can include about 1 wt %, about 1.5 wt %, or about 2 wt % to about 3 wt %, about 3.5 wt %, or about 4 wt % of the starch, based on a combined weight of the starch, paper, vermiculite, glass fibers, binding agent, perlite, and calcium sulfate. On a dry basis the aqueous mixture, prior to curing, can include about 8 wt %, about 10 wt %, or about 12 wt % to about 13 wt %, about 15 wt %, about 17 wt %, or about 19 wt % of the paper, based on a combined weight of the starch, paper, vermiculite, glass fibers, binding agent, perlite, and calcium sulfate. On a dry basis the aqueous mixture, prior to curing, can include about 0.5 wt %, about 1 wt %, or about 1.3 wt % to about 1.7 wt %, about 2 wt %, or about 2.5 wt % of the vermiculite, based on the combined weight of the starch, paper, vermiculite, glass fibers, binding agent, perlite, and calcium sulfate. On a dry basis the aqueous mixture, prior to curing, can include about 1 wt %, about 1.5 wt %, or about 2 wt % to about 2.5 wt %, about 3 wt %, or about 4 wt % of the reinforcing fibers, based on the combined weight of the starch, paper, vermiculite, glass fibers, binding agent, perlite, and calcium sulfate. On a dry basis the aqueous mixture, prior to curing, can include about 6 wt %, about 7 wt %, or about 8 wt % to about 9 wt %, about 10 wt %, or about 11 wt % of the binding agent, based on the combined weight of the starch, paper, vermiculite, glass fibers, binding agent, perlite, and calcium sulfate. On a dry basis the aqueous mixture, prior to curing, can include about 1.5 wt %, about 2 wt %, or about 2.5 wt % to about 3.5 wt %, about 4 wt %, or about 5 wt % of the perlite, based on the combined weight of the starch, paper, vermiculite, glass fibers, binding agent, perlite, and calcium sulfate. On a dry basis, the aqueous mixture, prior to curing, can include about 58 wt %, about 60 wt %, about 63 wt %, about 65 wt %, about 67 wt %, or about 70 wt % to about 72 wt %, about 75 wt %, about 77 wt %, or about 80 wt % of the calcium sulfate, based on the combined weight of the starch, paper, vermiculite, glass fibers, binding agent, perlite, and calcium sulfate.

In one example, on a dry basis the aqueous mixture, prior to curing, can include about 1.5 wt % to about 3 wt % of the starch, about 11 wt % to about 15 wt % of the paper, about 0.7 wt % to about 2.3 wt % of the vermiculite, about 1.3 wt % to about 3 wt % of the glass fibers, about 7 wt % to about 10 wt % of the binding agent, about 2 wt % to about 4 wt % of the perlite, and about 65 wt % to about 75 wt % of the calcium sulfate, based on a combined weight of the starch, paper, vermiculite, glass fibers, binding agent, perlite, and calcium sulfate. In another example, on a dry basis the aqueous mixture, prior to curing, can include about 2 wt % to about 2.6 wt % of the starch, about 12 wt % to about 13 wt % of the paper, about 1 wt % to about 2 wt % of the vermiculite, about 1.8 wt % to about 2.4 wt % of the glass fibers, about 8 wt % to about 9 wt % of the binding agent, about 2.5 wt % to about 3.5 wt % of the perlite, and about 68 wt % to about 72 wt % of the calcium sulfate, based on a combined weight of the starch, paper, vermiculite, glass fibers, binding agent, perlite, and calcium sulfate. In another example, on a dry basis the aqueous mixture, prior to curing, can include about 2.3 wt % to about 2.9 wt % of the starch, about 13 wt % to about 15 wt % of the paper, about 1.2 wt % to about 2.3 wt % of the vermiculite, about 2 wt % to about 2.8 wt % of the glass fibers, about 9 wt % to about 10 wt % of the binding agent, about 3 wt % to about 4 wt % of the perlite, and about 65 wt % to about 67.5 wt % of the calcium sulfate, based on a combined weight of the starch, paper, vermiculite, glass fibers, binding agent, perlite, and calcium sulfate.

The aqueous mixture or slurry can be prepared by mixing, blending, or otherwise combining the starch, paper, vermiculite, plurality of reinforcing fibers, binding agent, perlite, calcium sulfate, and water with one another in any order or sequence. For example, the starch, paper, vermiculite, and water can be introduced to a pulper and pulped to produce a pulped mixture. The starch, paper, vermiculite, and water can be pulped for a time period of about 20 minutes, about 30 minutes, about 40 minutes, or about 45 minutes to about 50 minutes, about 60 minutes, about 90 minutes, or about 120 minutes or more to produce the pulped mixture. The pulped mixture can be prepared at ambient or room temperature, e.g., about 25° C. The pulped mixture can be prepared at an elevated temperature, e.g., at a temperature of about 30° C., about 35° C., or about 40° C. to about 50° C., about 60° C., or about 70° C.

The pulped mixture can be introduced to a mixer and the plurality of reinforcing fibers, binding agent, perlite, and calcium sulfate can also be introduced to the mixer. The pulped mixture and the additional components can be mixed in the mixer to produce the aqueous mixture or slurry. The aqueous mixture or slurry can also be referred to as a moldable composition. The pulped mixture and the additional components can be mixed for about 20 seconds, about 30 seconds, about 40 seconds, about 50 seconds, or about 60 seconds to about 80 seconds, about 100 seconds, about 120 seconds, about 150 seconds, about 180 seconds, or more to produce the aqueous mixture. The aqueous mixture can be prepared at ambient or room temperature, e.g., about 25° C. The aqueous mixture can be prepared at an elevated temperature, e.g., at a temperature of about 30° C., about 35° C., or about 40° C. to about 50° C., about 60° C., or about 70° C.

In some examples, the aqueous mixture can be dried for about 10 minute, about 30 minutes, about 1 hour, about 3 hours, or about 5 hours to about 7 hours, about 8 hours, about 9 hours, or about 10 hours to produce the gypsum based composition. In other examples, the aqueous mixture can be dried for about 10 hours, about 12 hours, or about 15 hours to about 18 hours, about 21 hours, or about 24 hours or more to produce the gypsum based composition. In some examples, the aqueous mixture can be dried at a temperature of about 100° C., about 105° C., or about 110° C. to about 120° C., about 130° C., or about 140° C. to produce the gypsum based composition. In other examples, the aqueous mixture can be dried at a temperature of about 150° C., about 175° C., or about 200° C. to about 250° C., about 290° C., or about 315° C. to produce the gypsum based composition. In at least one example, the aqueous mixture can be dried at a temperature of about 100° C. to about 140° C. for a time of about 10 hours to about 24 hours to produce the gypsum based composition. As noted above, drying the aqueous mixture can cause or accelerate the calcium sulfate to react with the water to produce calcium sulfate hemihydrate and/or calcium sulfate dihydrate.

As noted above, the aqueous mixture can be molded, formed, or otherwise shaped into one or more desirable articles such as panels or boards. The panel or board can be suitable for use as a door core, e.g., a door core in a fire resistant door. The board or panel can be used for blocking fire door cores in fire resistant doors. In one example, the aqueous mixture can be poured, dumped, or otherwise transferred from the mixer onto a forming table. The aqueous mixture can be pressed to compress the aqueous mixture into a compressed body. The compressed body can be dried to produce the gypsum based composition body, e.g., a panel or board. The aqueous mixture can be pressed by a press, e.g., a hydraulic press, at about 250 tons of force, about 300 tons of force, or about 350 tons of force. As noted above, the aqueous mixture can be dried at a temperature of about 100° C. to about 315° C. for about 10 minute to about 24 hours or more to produce the gypsum based composition. In at least one example, the aqueous mixture can be dried at a temperature of about 100° C. to about 140° C. for a time of about 10 hours to about 24 hours to produce the gypsum based composition.

When the gypsum based composition is in the form of a panel or board, the gypsum based composition can have a thickness of about 1 cm, about 2 cm, about 2.5 cm, or about 3 cm to about 4 cm, about 4.5 cm, about 5 cm, or about 6 cm or more. The gypsum based composition, when in the form of a panel or board, can have a length of about 5 cm, about 10 cm, about 25 cm, about 50 cm, or about 100 cm to about 200 cm, about 250 cm, or about 300 cm or more. The gypsum based composition, when in the form of a panel or board, can have a width of about 5 cm, about 10 cm, about 25 cm, about 50 cm, or about 60 cm to about 90 cm, about 100 cm, about 125 cm, or about 150 cm.

The gypsum based composition can be processed in automatic processes. For example, the gypsum based composition can be processed in a similar or the same manner as particle board via one or more automated stackers and/or banding machines to process the gypsum based composition into door cores.

FIG. 1 depicts an illustrative banded core 100 that includes the gypsum based composition as the core 105, according to one or more embodiments. The banded core 100 can include the core 105, a first or "top" rail 110, a second or "bottom" rail 115, a first or "left" stile 120, and a second or "right" stile 125. The core 105 can consist entirely of the gypsum based composition. Said another way, in at least one example, the core 105 can be free of any blocking material. As such, in at least one example, the core 105 can be a continuous body consisting entirely of the gypsum based composition. The core 105 can have a thickness of about 3.5 cm to about 4.5 cm, a length of about 2 m to about 3 m, and a width of about 60 cm to about 125 cm.

The rails 110, 115 and the stiles 120, 125 can have the same or substantially the same thickness as the core 105. The rails 110, 115 and the stiles 120, 125 can have a width of about 1.25 cm, about 1.75 cm, or about 2 cm, about 2.5 cm, or about 3 cm to about 4 cm, about 5 cm, about 7 cm, or about 10 cm. The rails 110, 115 and the stiles 120, 125 can be or can include gypsum and paper fiber, wood, and/or manufactured wood. In some examples, the rails (110, 115) and stiles (120, 125) can be or include the gypsum based composition. As such, in at least one example, the core 105, the rails 110, 115, and the stiles 120, 125 can all be or include the gypsum based composition.

The rails 110, 115 and the stiles 120, 125 can be adhered, secured, or otherwise affixed to the core 105 with one or more adhesives, mechanical fasteners, or any combination thereof. Suitable adhesives can include, but are not limited to, hot melt adhesives, thermosetting adhesives, polyisocyanate, epoxy, cyanoacrylate, polyvinyl acetate, or any mixture thereof. Illustrative hot melt adhesives can include, but are not limited to, polyurethane adhesives, polyethylene adhesives, polypropylene adhesives, polyamide adhesives, polyester adhesives, polyisocyanate adhesives, ethyl vinyl acetate adhesives, butyl rubber, silicone rubbers, styrene-butadiene-styrene, styrene-isoprene-styrene, styrene-butadiene, styrene-ethyl ene-butadiene-styrene, or any mixture thereof. Suitable mechanical fasteners can include, but are not limited to, nails, screws, stables, brads, or the like, and can be used in lieu of or in addition to the adhesive to affix the rails 110, 115 and the stiles 120, 125 to the core 105 to produce the banded core 100.

In some examples the core 105 can be composed of multiple components or bodies with the gypsum based composition serving as blocking material in a door core. For example, the gypsum based composition can be sized to serve as a kick plate or panel, a top plate or panel, a middle plate or panel, a door knob or door handle receiving panel, a hinge receiving panel, or any other location on a banded core that can be subject to additional stress during the life of the door. The other locations can be made from other gypsum type materials, wood, or other materials generally used in the manufacture of banded cores.

Figure 2:
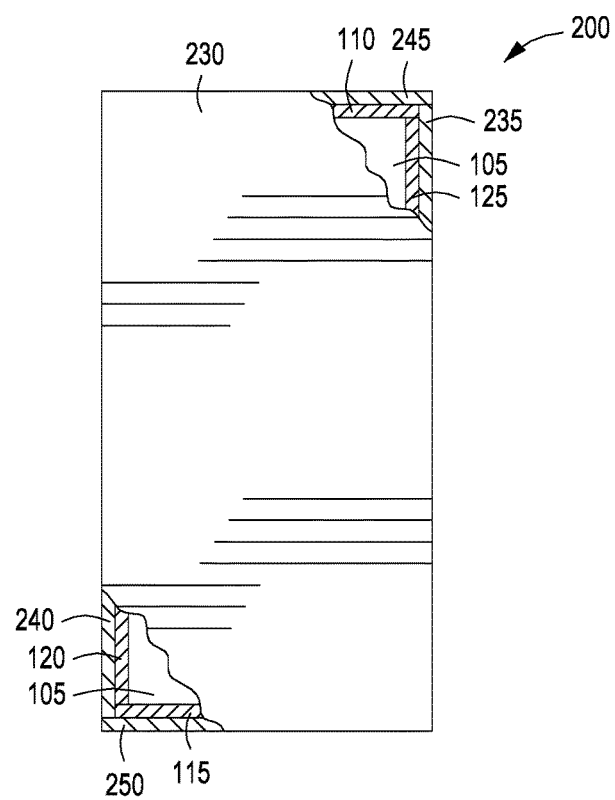
FIG. 2 depicts an illustrative fire resistant door, according to one or more embodiments described.

FIG. 2 depicts an illustrative fire resistant door 200, according to one or more embodiments. The fire resistant door 200 can include the banded core 100 discussed and described above with reference to FIG. 1. The fire resistant core can also include one or more veneers or "facing layers" adhered or otherwise affixed thereto. For example, the fire resistant door 200, as depicted in FIG. 2, can include a first veneer or facing layer 230, a second veneer facing layer 235, a third veneer facing layer 240, a fourth veneer facing layer 245, and a fifth veneer facing layer 250 that can be affixed about a first side, a second side, a third side, a fourth side, and a fifth side, respectively, of the banded veneer 100. A sixth veneer facing layer (not shown) can be affixed to a sixth side of the banded core 100, where the sixth side of the banded core is opposed to the first side that the first veneer 230 can be affixed to. One or more adhesives can be used to adhere or otherwise affix the veneers 230, 235, 240, 245, and 250 to the banded core 100. Suitable adhesives can include any one more of the hot melt adhesives, thermosetting adhesives, polyisocyanate, epoxy, cyanoacrylate, polyvinyl acetate, or mixtures thereof described above. The veneers 230, 235, 240, 245, and 250 can be applied to the banded core 100 via hot or cold press.

The veneers 230, 235, 240, 245, and 250 can be or include any suitable material capable of serving as a facing layer. Illustrative materials from which the veneers 230, 235, 240, 245, and 250 can be made from can include, but are not limited to, gypsum fiberboard; wood; plastic; metal; glass; composite wood, e.g., wafer board, particle board, oriented strand board, plywood, fiberboard, and medium density fiberboard; cement board; wood-plastic composites, plastic-cement composites, or a combination thereof.

The fire resistant door 200 can have a fire rating of at least 90 minutes, as measured according to the UL 10C (2009). The fire resistant door 200 can have a STC of 35 or greater, 36 or greater, 37 or greater, 38 or greater, 39 or greater, or 40 or greater, as measured according to ASTM E413-10 and ASTM E90-09. The fire resistant door can be free of any blocking. The fire resistant door 200, with or without blocking, can be rated as an extra heavy duty classed fire door, as evaluated according to WDMA I.S. 1-A-14. Without wishing to be bound by theory, it is believed the fire resistant door 200 can meet or exceed the requirements of the 120-minute fire rating, as measured according to BS-476-22:1987. Also without wishing to be bound by theory, it is believed the fire resistant door 200 can have a fire rating of at least 120 minutes, as measured according to BS-476-22:1987, without any blocking.

EXAMPLES

In order to provide a better understanding of the foregoing discussion, the following non-limiting examples are offered. Although the examples may be directed to specific embodiments, they are not to be viewed as limiting the invention in any specific respect. All parts, proportions, and percentages are by weight unless otherwise indicated.

A panel made from the gypsum based composition was made according to the following procedure. The starch, paper, vermiculite, and water were added to a pulper in the amounts shown in the Table below and pulped for about 50 minutes to produce a pulped mixture. The pulped mixture, glass fibers, cement, expanded perlite, and gypsum were introduced to a mixer and mixed for about 55 seconds to produce an aqueous slurry. The aqueous slurry was dumped onto a forming table and pressed by a hydraulic press at a pressure of about 300 tons of force to produce a compressed panel. The compressed panel was dried in a kiln heated to a temperature of about 107° C. for about 18 hours to produce the dried panel composed of the gypsum based composition. The dried panel had a length of about 3 m, a width of about 58.5 cm, and a thickness of about 3.8 cm to about 4.3 cm.

TABLE

| Component | Aqueous Mixture wt % | Gypsum Based Composition wt % |
| --- | --- | --- |
| Starch | 0.75 | 2.30 |
| Paper | 4.08 | 12.49 |
| Vermiculite | 0.50 | 1.53 |
| Glass fibers | 0.69 | 2.11 |
| Calcium Sulfate | 19.29 | 70.03 |
| Expanded Perlite | 1.01 | 3.09 |
| Cement | 2.76 | 8.45 |
| Water | 70.92 | 0 |

The dried panel had a density of about 0.85 g/cm$^3$ and a contained less than 2 wt % of free water. The dried panel had a minimum face screw holding strength of at least 2,450 N, a minimum vertical door edge screw holding of at least 2,450 N, and a horizontal door edge screw holding of at least 1,330 N, as measured according to WDMA T.M. 10-14. The panel also had a minimum hinge-loading of at least 2,450 N, as measured according to WDMA T.M. 8-14.

A fire door was made using the panel as the door core, without any blocking according to the following procedure. The core was banded with about 3.8 cm thick HDF rails along the top and bottom and about 2.5 cm thick HDF stiles along the left and right sides. Finally a layer of veneer having a thickness of about 3.2 mm was used to cover the core and banding material to form the fire door. The veneer was adhered to the core and banding material with a polyurethane adhesive. The fire resistant door was subjected to the 90 minute fire test according to UL 10C (2009) and the fire resistant door met all requirements.

Embodiments of the present disclosure further relate to any one or more of the following paragraphs:

1. A gypsum based composition, comprising a cured aqueous mixture, wherein prior to curing the aqueous mixture comprises about 0.5 wt % to about 1 wt % starch, about 2.5 wt % to about 5.5 wt % paper, about 0.2 wt % to about 0.8 wt % vermiculite, about 0.4 wt % to about 1 wt % reinforcing fibers, about 2 wt % to about 3.3 wt % binding agent, about 0.5 wt % to about 1.5 wt % perlite, about 12 wt % to about 25 wt % calcium sulfate, and about 60 wt % to about 80 wt % water, based on the combined weight of the starch, paper, vermiculite, reinforcing fibers, calcium sulfate, perlite, binding agent, and water.

2. A process for making a gypsum based composition, comprising: mixing a starch, a paper, vermiculite, a plurality of reinforcing fibers, a binding agent, perlite, a calcium sulfate, and water to produce an aqueous mixture comprising about 0.5 wt % to about 1 wt % of the starch, about 2.5 wt % to about 5.5 wt % of the paper, about 0.2 wt % to about 0.8 wt % of the vermiculite, about 0.4 wt % to about 1 wt % of the reinforcing fibers, about 2 wt % to about 3.3 wt % of the binding agent, about 0.5 wt % to about 1.5 wt % of the perlite, about 12 wt % to about 25 wt % of the calcium sulfate, and about 60 wt % to about 80 wt % of the water, based on the combined weight of the starch, paper, vermiculite, reinforcing fibers, calcium sulfate, perlite, binding agent, and water; and drying the aqueous mixture to produce a gypsum based composition.

3. A process for making a moldable composition, comprising: mixing a starch, a paper, vermiculite, and water to produce a first mixture; pulping the first mixture to produce a pulp; mixing a plurality of reinforcing fibers, a binding agent, perlite, and a calcium sulfate with the pulp to produce a moldable composition, wherein the moldable composition comprises about 0.5 wt % to about 1 wt % of the starch, about 2.5 wt % to about 5.5 wt % of the paper, about 0.2 wt % to about 0.8 wt % of the vermiculite, about 0.4 wt % to about 1 wt % of the reinforcing fibers, about 2 wt % to about 3.3 wt % of the binding agent, about 0.5 wt % to about 1.5 wt % of the perlite, about 12 wt % to about 25 wt % of the calcium sulfate, and about 60 wt % to about 80 wt % of the water, based on the combined weight of the starch, paper, vermiculite, reinforcing fibers, calcium sulfate, perlite, binding agent, and water.

4. A fire door, comprising: a core comprising a gypsum based composition comprising a cured aqueous mixture, wherein the aqueous mixture, prior to curing, comprises about 1.5 wt % to about 3 wt % of a starch, about 11 wt % to about 14 wt % of a paper, about 0.7 wt % to about 2.3 wt % of vermiculite, about 1.3 wt % to about 3 wt % of a plurality of reinforcing fibers, about 7 wt % to about 10 wt % of a binding agent, about 2 wt % to about 4 wt % of perlite, and about 65 wt % to about 75 wt % of a calcium sulfate, based on a combined weight of the starch, paper, vermiculite, plurality of reinforcing fibers, binding agent, perlite, and calcium sulfate.

5. A fire door, comprising: a first facing layer; a second facing layer; and a core disposed between the first facing layer and the second facing layer, wherein the core comprises a gypsum based composition comprising a cured aqueous mixture, and wherein the aqueous mixture, prior to curing, comprises about 1.5 wt % to about 3 wt % of a starch, about 11 wt % to about 14 wt % of a paper, about 0.7 wt % to about 2.3 wt % of vermiculite, about 1.3 wt % to about 3 wt % of a plurality of reinforcing fibers, about 7 wt % to about 10 wt % of a binding agent, about 2 wt % to about 4 wt % of perlite, and about 65 wt % to about 75 wt % of a calcium sulfate, based on a combined weight of the starch, paper, vermiculite, plurality of reinforcing fibers, binding agent, perlite, and calcium sulfate.

6. A laminated structure, comprising: a first facing layer; a second facing layer; and a core disposed between the first facing layer and the second facing layer, wherein the core comprises a gypsum based composition comprising a cured aqueous mixture, and wherein the aqueous mixture, prior to curing, comprises about 1.5 wt % to about 3 wt % of a starch, about 11 wt % to about 14 wt % of a paper, about 0.7 wt % to about 2.3 wt % of vermiculite, about 1.3 wt % to about 3 wt % of a plurality of reinforcing fibers, about 7 wt % to about 10 wt % of a binding agent, about 2 wt % to about 4 wt % of perlite, and about 65 wt % to about 75 wt % of a calcium sulfate, based on a combined weight of the starch, paper, vermiculite, plurality of reinforcing fibers, binding agent, perlite, and calcium sulfate.

7. The gypsum based composition, the process, the fire door, or the laminated structure, according to any one of paragraphs 1 to 6, wherein the calcium sulfate comprises calcium sulfate hemihydrate, calcium sulfate dihydrate, or a mixture thereof.

8. The gypsum based composition, the process, the fire door, or the laminated structure, according to any one of paragraphs 1 to 7, wherein the calcium sulfate comprises gypsum.

9. The gypsum based composition, the process, the fire door, or the laminated structure, according to any one of paragraphs 1 to 8, wherein the starch comprises corn starch.

10. The gypsum based composition, the process, the fire door, or the laminated structure, according to any one of paragraphs 1 to 9, wherein the starch comprises non-pregelatinized starch.

11. The gypsum based composition, the process, the fire door, or the laminated structure, according to any one of paragraphs 1 to 10, wherein the starch comprises non-pregelatinized acid modified starch.

12. The gypsum based composition, the process, the fire door, or the laminated structure, according to any one of paragraphs 1 to 11, wherein the paper comprises post-industrial blank recycled newsprint.

13. The gypsum based composition, the process, the fire door, or the laminated structure, according to any one of paragraphs 1 to 12, wherein the vermiculite comprises unexpanded vermiculite having a density of about 0.9 g/cm$^3$ to about 1.2 g/cm$^3$.

14. The gypsum based composition, the process, the fire door, or the laminated structure, according to any one of paragraphs 1 to 13, wherein the plurality of reinforcing fibers comprises glass fibers.

15. The gypsum based composition, the process, the fire door, or the laminated structure, according to any one of paragraphs 1 to 14, wherein the plurality of reinforcing fibers has an average length of about 0.25 cm to about 2 cm.

16. The gypsum based composition, the process, the fire door, or the laminated structure, according to any one of paragraphs 1 to 15, wherein the binding agent comprises fly ash, sodium silicate, or a cement.

17. The gypsum based composition, the process, the fire door, or the laminated structure, according to any one of paragraphs 1 to 16, wherein the binding agent comprises a cement, and wherein the cement comprises Portland cement Type III.

18. The gypsum based composition, the process, the fire door, or the laminated structure, according to any one of paragraphs 1 to 17, wherein the perlite comprises expanded perlite having a density of about 0.03 g/cm$^3$ to about 0.15 g/cm$^3$.

19. The gypsum based composition, the process, the fire door, or the laminated structure, according to any one of paragraphs 1 to 18, wherein the gypsum based composition is in a form of a panel.

20. The gypsum based composition, the process, the fire door, or the laminated structure, according to any one of paragraphs 1 to 19, wherein the gypsum based composition is in a form of a panel having a thickness of about 3.5 cm to about 4.5 cm, a length of about 2 m to about 3 m, and a width of about 60 cm to about 125 cm.

21. The gypsum based composition, the process, the fire door, or the laminated structure, according to any one of paragraphs 1 to 20, wherein the gypsum based composition has a density of about 0.7 g/cm$^3$ to about 1 g/cm$^3$, as measured according to ASTM D1037-12.

22. The gypsum based composition, the process, the fire door, or the laminated structure, according to any one of paragraphs 1 to 21, wherein the gypsum based composition is in a form of a panel and has a minimum face screw holding strength of at least 2,450 N, as measured according to WDMA T.M. 10-14.

23. The gypsum based composition, the process, the fire door, or the laminated structure, according to any one of paragraphs 1 to 22, wherein the gypsum based composition is in a form of a panel and has a minimum face screw holding strength of 2,450 N to about 2,800 N, as measured according to WDMA T.M. 10-14.

24. The gypsum based composition, the process, the fire door, or the laminated structure, according to any one of paragraphs 1 to 23, wherein the gypsum based composition is in a form of a panel and has a minimum hinge-loading of 2,450 N, as measured according to WDMA T.M. 8-14.

25. The gypsum based composition, the process, the fire door, or the laminated structure, according to any one of paragraphs 1 to 24, wherein the gypsum based composition is in a form of a panel and has a minimum hinge-loading of 2,450 N to about 3,600 N, as measured according to WDMA T.M. 8-14.

26. The gypsum based composition, the process, the fire door, or the laminated structure, according to any one of paragraphs 1 to 25, wherein the gypsum based composition is in a form of a panel and has a minimum vertical door edge screw holding of 2,450 N, as measured according to WDMA T.M. 10-14.

27. The gypsum based composition, the process, the fire door, or the laminated structure, according to any one of paragraphs 1 to 26, wherein the gypsum based composition is in a form of a panel and has a minimum vertical door edge screw holding of 2,450 N to about 3,600 N, as measured according to WDMA T.M. 10-14.

28. The gypsum based composition, the process, the fire door, or the laminated structure, according to any one of paragraphs 1 to 27, wherein the gypsum based composition is in a form of a panel and has a minimum horizontal door edge screw holding of 1,330 N, as measured according to WDMA T.M. 10-14.

29. The gypsum based composition, the process, the fire door, or the laminated structure, according to any one of paragraphs 1 to 28, wherein the gypsum based composition is in a form of a panel and has a minimum horizontal door edge screw holding of 1,330 N to about 2,700 N, as measured according to WDMA T.M. 10-14.

30. The gypsum based composition, the process, the fire door, or the laminated structure, according to any one of paragraphs 1 to 29, wherein the gypsum based composition, without blocking, is rated for use in an extra heavy duty classed fire door, as determined according to WDMA I.S. 1-A-14, and wherein the extra heavy duty classed fire door is rated up to 90 minutes, as measured according to UL 10C (2009).

31. The gypsum based composition, the process, the fire door, or the laminated structure, according to any one of paragraphs 1 to 30, wherein the gypsum based composition further comprises free water, and wherein the free water is present in an amount of less than 2 wt %, based on a combined weight of the starch, paper, vermiculite, plurality of reinforcing fibers, binding agent, perlite, calcium sulfate, and free water.

32. The process according to any one of paragraphs 2, 3, and 7 to 31, wherein, prior to drying the aqueous mixture is transferred to a forming surface and pressed to form a compressed mixture, wherein the compressed mixture is dried.

33. The process according to any one of paragraphs 2, 3, and 7 to 32, further comprising drying the moldable composition to produce a gypsum based composition.

34. The process according to any one of paragraphs 2, 3, and 7 to 33, further comprising: transferring the moldable composition to a forming surface; pressing the moldable composition to form a compressed composition; and drying the compressed composition to form a gypsum based composition.

35. The fire door or laminated structure according to any one of paragraphs 4 to 31, wherein the fire door has a 90-minute fire rating, as measured according to the UL 10C (2009).

36. The fire door or laminated structure according to any one of paragraphs 4 to 31 and 35, wherein the core is banded with first and second rails disposed on opposite ends thereof, and first and second stiles disposed on opposite sides thereof.

37. The fire door or laminated structure according to any one of paragraphs 4 to 31, 35, and 36, wherein the core is free of any blocking.

38. The fire door or laminated structure according to any one of paragraphs 4 to 31 and 35 to 37, wherein the core is free of any blocking material.

39. The fire door or laminated structure according to any one of paragraphs 4 to 31 and 35 to 38, wherein the fire door has a STC of 35 or greater, as measured according to ASTM E413-10 and ASTM E90-09.

40. The fire door or laminated structure according to any one of paragraphs 4 to 31 and 35 to 39, wherein the fire door is an extra heavy duty classed fire door, as determined according to WDMA I.S. 1-A-14.

41. A gypsum based composition, comprising: about 1.5 wt % to about 3 wt % of a starch; about 11 wt % to about 14 wt % of a paper; about 0.7 wt % to about 2.3 wt % of vermiculite; about 1.3 wt % to about 3 wt % of a plurality of reinforcing fibers; about 7 wt % to about 10 wt % of a binding agent; about 2 wt % to about 4 wt % of perlite; and about 65 wt % to about 75 wt % of a calcium sulfate, wherein all weight percent values are based on a combined weight of the starch, paper, vermiculite, plurality of reinforcing fibers, binding agent, perlite, and calcium sulfate.

42. A process for making a gypsum based composition, comprising: mixing a starch, a paper, vermiculite, a plurality of reinforcing fibers, a binding agent, perlite, a calcium sulfate, and water to produce an aqueous mixture comprising about 0.5 wt % to about 1 wt % of the starch, about 2.5 wt % to about 5.5 wt % of the paper, about 0.2 wt % to about 0.8 wt % of the vermiculite, about 0.4 wt % to about 1 wt % of the reinforcing fibers, about 2 wt % to about 3.3 wt % of the binding agent, about 0.5 wt % to about 1.5 wt % of the perlite, about 12 wt % to about 25 wt % of the calcium sulfate, and about 60 wt % to about 80 wt % of the water, wherein all weight percent values are based on a combined weight of the starch, paper, vermiculite, reinforcing fibers, calcium sulfate, perlite, binding agent, and water; and curing the aqueous mixture to produce the gypsum based composition.

43. A laminated structure, comprising: a first facing layer; a second facing layer; and a core disposed between the first facing layer and the second facing layer, wherein the core comprises a gypsum based composition comprising: about 1.5 wt % to about 3 wt % of a starch, about 11 wt % to about 14 wt % of a paper, about 0.7 wt % to about 2.3 wt % of vermiculite, about 1.3 wt % to about 3 wt % of a plurality of reinforcing fibers, about 7 wt % to about 10 wt % of a binding agent, about 2 wt % to about 4 wt % of perlite, and about 65 wt % to about 75 wt % of a calcium sulfate, based on a combined weight of the starch, paper, vermiculite, plurality of reinforcing fibers, binding agent, perlite, and calcium sulfate.

44. A process for making a moldable composition, comprising: mixing a starch, a paper, vermiculite, and water to produce a first mixture; pulping the first mixture to produce a pulp; mixing a plurality of reinforcing fibers, a binding agent, perlite, and a calcium sulfate with the pulp to produce a moldable composition, wherein the moldable composition comprises about 0.5 wt % to about 1 wt % of the starch, about 2.5 wt % to about 5.5 wt % of the paper, about 0.2 wt % to about 0.8 wt % of the vermiculite, about 0.4 wt % to about 1 wt % of the reinforcing fibers, about 2 wt % to about 3.3 wt % of the binding agent, about 0.5 wt % to about 1.5 wt % of the perlite, about 12 wt % to about 25 wt % of the calcium sulfate, and about 60 wt % to about 80 wt % of the water, wherein all weight percent values are based on a combined weight of the starch, paper, vermiculite, reinforcing fibers, calcium sulfate, perlite, binding agent, and water; and curing the aqueous mixture to produce the gypsum based composition.

45. A fire door, comprising: a core comprising a gypsum based composition comprising about 1.5 wt % to about 3 wt % of a starch; about 11 wt % to about 14 wt % of a paper; about 0.7 wt % to about 2.3 wt % of vermiculite; about 1.3 wt % to about 3 wt % of a plurality of reinforcing fibers; about 7 wt % to about 10 wt % of a binding agent; about 2 wt % to about 4 wt % of perlite; and about 65 wt % to about 75 wt % of a calcium sulfate, wherein all weight percent values are based on a combined weight of the starch, paper, vermiculite, plurality of reinforcing fibers, binding agent, perlite, and calcium sulfate.

46. A fire door, comprising: a first facing layer; a second facing layer; and a core disposed between the first facing layer and the second facing layer, wherein the core comprises a gypsum based composition comprising about 1.5 wt % to about 3 wt % of a starch; about 11 wt % to about 14 wt % of a paper; about 0.7 wt % to about 2.3 wt % of vermiculite; about 1.3 wt % to about 3 wt % of a plurality of reinforcing fibers; about 7 wt % to about 10 wt % of a binding agent; about 2 wt % to about 4 wt % of perlite; and about 65 wt % to about 75 wt % of a calcium sulfate, wherein all weight percent values are based on a combined weight of the starch, paper, vermiculite, plurality of reinforcing fibers, binding agent, perlite, and calcium sulfate.

47. The gypsum based composition, the process, the laminated structure, or the fire door according to any one of paragraphs 41 to 46, wherein the gypsum based composition further comprises free water, and wherein the gypsum based composition comprises less than 2 wt % of the free water.

48. The gypsum based composition, the process, the laminated structure, or the fire door according to any one of paragraphs 41 to 47, wherein the gypsum based composition is in a form of a panel having a thickness of about 3.5 cm to about 4.5 cm, a length of about 2 m to about 3 m, and a width of about 60 cm to about 125 cm.

49. The gypsum based composition, the process, the laminated structure, or the fire door according to any one of paragraphs 41 to 48, wherein the gypsum based composition has a density of about 0.7 g/cm$^3$ to about 1 g/cm$^3$, as measured according to ASTM D1037-12.

50. The gypsum based composition, the process, the laminated structure, or the fire door according to any one of paragraphs 41 to 49, wherein the gypsum based composition is in a form of a panel and has a minimum face screw holding strength of 2,450 N, as measured according to WDMA T.M. 10-14.

51. The gypsum based composition, the process, the laminated structure, or the fire door according to any one of paragraphs 41 to 50, wherein the gypsum based composition is in a form of a panel and has a minimum hinge-loading of 2,450 N, as measured according to WDMA T.M. 10-14.

52. The gypsum based composition, the process, the laminated structure, or the fire door according to any one of paragraphs 41 to 51, wherein the gypsum based composition is in a form of a panel and has a minimum vertical door edge screw holding of 2,450 N, as measured according to WDMA T.M. 10-14.

53. The gypsum based composition, the process, the laminated structure, or the fire door according to any one of paragraphs 41 to 52, wherein the gypsum based composition is in a form of a panel and has a minimum horizontal door edge screw holding of 1,330 N, as measured according to WDMA T.M. 10-14.

54. The gypsum based composition, the process, the laminated structure, or the fire door according to any one of paragraphs 41 to 49, wherein the gypsum based composition is in a form of a panel and has a minimum face screw holding strength of 2,450 N to about 2,800 N, as measured according to WDMA T.M. 10-14.

55. The gypsum based composition, the process, the laminated structure, or the fire door according to any one of paragraphs 41 to 50, wherein the gypsum based composition is in a form of a panel and has a minimum hinge-loading of 2,450 N to about 3,600 N, as measured according to WDMA T.M. 10-14.

56. The gypsum based composition, the process, the laminated structure, or the fire door according to any one of paragraphs 41 to 51, wherein the gypsum based composition is in a form of a panel and has a minimum vertical door edge screw holding of 2,450 N to about 3,600 N, as measured according to WDMA T.M. 10-14.

57. The gypsum based composition, the process, the laminated structure, or the fire door according to any one of paragraphs 41 to 52, wherein the gypsum based composition is in a form of a panel and has a minimum horizontal door edge screw holding of 1,330 N to about 2,700 N, as measured according to WDMA T.M. 10-14.

58. The gypsum based composition, the process, the laminated structure, or the fire door according to any one of paragraphs 41 to 57, wherein the gypsum based composition, without blocking, is rated for use in an extra heavy duty classed fire door, as determined according to WDMA I.S. 1-A-14, and wherein the extra heavy duty classed fire door is rated for at least 90 minutes, as measured according to UL 10C (2009).

59. The gypsum based composition, the process, the laminated structure, or the fire door according to any one of paragraphs 41 to 58, wherein the plurality of reinforcing fibers comprise glass fibers having an average length of about 0.25 cm to about 2 cm.

60. The gypsum based composition, the process, the laminated structure, or the fire door according to any one of paragraphs 41 to 59, wherein the binding agent comprises fly ash, sodium silicate, or a cement.

61. The gypsum based composition, the process, the laminated structure, or the fire door according to any one of paragraphs 41 to 60, wherein the binding agent comprises a cement, and wherein the cement comprises Portland cement Type III.

62. The gypsum based composition, the process, the laminated structure, or the fire door according to any one of paragraphs 41 to 63, wherein the gypsum based composition comprises: about 2 wt % to about 2.6 wt % of the starch, about 12 wt % to about 13 wt % of the paper, about 1 wt % to about 2 wt % of the vermiculite, about 1.7 wt % to about 2.5 wt % of the plurality of reinforcing fibers, about 7 wt % to about 10 wt % of the binding agent, about 2 wt % to about 4 wt % of the perlite, and about 67 wt % to about 73 wt % of the calcium sulfate, wherein all weight percent values are based on the combined weight of the starch, paper, vermiculite, plurality of reinforcing fibers, binding agent, perlite, and calcium sulfate.

63. The gypsum based composition, the process, the laminated structure, or the fire door according to any one of paragraphs 41 to 62, wherein the calcium sulfate comprises anhydrous calcium sulfate, calcium sulfate hemihydrate, calcium sulfate dihydrate, or a mixture thereof.

64. The gypsum based composition, the laminated structure, or the fire door according to any one of paragraphs 41, 43, and 45 to 63, wherein the calcium sulfate comprises calcium sulfate dihydrate.

65. The gypsum based composition, the process, the laminated structure, or the fire door according to any one of paragraphs 41 to 64, wherein: the starch comprises corn starch, the paper comprises post-industrial blank recycled newsprint, the vermiculite comprises raw vermiculite, the plurality of reinforcing fibers comprises glass fibers, the binding agent comprises gypsum, the perlite comprises expanded perlite, and the calcium sulfate comprises calcium sulfate dihydrate.

66. The process according to any one of paragraphs 42, 44, and 47 to 64, wherein the aqueous mixture is cured by drying the aqueous mixture at a temperature of about 100° C. to about 315° C. for a time period of about 10 minutes to about 24 hours.

67. The process according to any one of paragraphs 42, 44, and 47 to 64, wherein the gypsum based composition is in a form of a panel having a thickness of about 3.5 cm to about 4.5 cm, a length of about 2 m to about 3 m, and a width of about 60 cm to about 125 cm Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A gypsum based composition, comprising:
    about 1.5 wt % to about 3 wt % of a starch;
    about 11 wt % to about 14 wt % of a paper;
    about 0.7 wt % to about 2.3 wt % of vermiculite;
    about 1.3 wt % to about 3 wt % of a plurality of reinforcing fibers;
    about 7 wt % to about 10 wt % of a binding agent;
    about 2 wt % to about 4 wt % of perlite; and
    about 65 wt % to about 75 wt % of a calcium sulfate, wherein all weight percent values are based on a combined weight of the starch, paper, vermiculite, plurality of reinforcing fibers, binding agent, perlite, and calcium sulfate.

2. The gypsum based composition of claim 1, wherein the gypsum based composition further comprises free water, and wherein the gypsum based composition comprises less than 2 wt % of the free water.

3. The gypsum based composition of claim 1, wherein the gypsum based composition is in a form of a panel having a thickness of about 3.5 cm to about 4.5 cm, a length of about 2 m to about 3 m, and a width of about 60 cm to about 125 cm.

4. The gypsum based composition of claim 1, wherein the gypsum based composition has a density of about 0.7 g/cm$^3$ to about 1 g/cm$^3$, as measured according to ASTM D1037-12.

5. The gypsum based composition of claim 1, wherein the gypsum based composition is in a form of a panel and has at least one property selected from the group consisting of: a minimum face screw holding strength of at least 2,450 N, a minimum hinge-loading of 2,450 N, a minimum vertical door edge screw holding of 2,450 N, and a minimum horizontal door edge screw holding of 1,330 N, wherein all properties are measured according to WDMA T.M. 10-14.

6. The gypsum based composition of claim 1, wherein the gypsum based composition, without blocking, is rated for use in an extra heavy duty classed fire door, as determined according to WDMA I.S. 1-A-14, and wherein the extra heavy duty classed fire door is rated for at least 90 minutes, as measured according to UL 10C (2009).

7. The gypsum based composition of claim 1, wherein the plurality of reinforcing fibers comprise glass fibers having an average length of about 0.25 cm to about 2 cm.

8. The gypsum based composition of claim 1, wherein the binding agent comprises fly ash, sodium silicate, or a cement.

9. The gypsum based composition of claim 1, wherein the binding agent comprises a cement, and wherein the cement comprises Portland cement Type III.

10. The gypsum based composition of claim 1, wherein the gypsum based composition comprises:
    about 2 wt % to about 2.6 wt % of the starch,
    about 12 wt % to about 13 wt % of the paper,
    about 1 wt % to about 2 wt % of the vermiculite,
    about 1.7 wt % to about 2.5 wt % of the plurality of reinforcing fibers,
    about 7 wt % to about 10 wt % of the binding agent,
    about 2 wt % to about 4 wt % of the perlite, and
    about 67 wt % to about 73 wt % of the calcium sulfate, wherein all weight percent values are based on the combined weight of the starch, paper, vermiculite, plurality of reinforcing fibers, binding agent, perlite, and calcium sulfate.

11. The gypsum based composition of claim 1, wherein:
    the starch comprises corn starch,
    the paper comprises post-industrial blank recycled newsprint,
    the vermiculite comprises raw vermiculite,
    the plurality of reinforcing fibers comprises glass fibers,
    the binding agent comprises gypsum,
    the perlite comprises expanded perlite, and
    the calcium sulfate comprises calcium sulfate dihydrate.

12. A process for making a gypsum based composition, comprising:
    mixing a starch, a paper, vermiculite, a plurality of reinforcing fibers, a binding agent, perlite, a calcium sulfate, and water to produce an aqueous mixture comprising about 0.5 wt % to about 1 wt % of the starch, about 2.5 wt % to about 5.5 wt % of the paper, about 0.2 wt % to about 0.8 wt % of the vermiculite, about 0.4 wt % to about 1 wt % of the reinforcing fibers, about 2 wt % to about 3.3 wt % of the binding agent, about 0.5 wt % to about 1.5 wt % of the perlite, about 12 wt % to about 25 wt % of the calcium sulfate, and about 60 wt % to about 80 wt % of the water, wherein all weight percent values are based on a combined weight of the starch, paper, vermiculite, reinforcing fibers, calcium sulfate, perlite, binding agent, and water; and curing the aqueous mixture to produce the gypsum based composition.

13. The process of claim 12, wherein the gypsum based composition comprises about 1.5 wt % to about 3 wt % of the starch, about 11 wt % to about 14 wt % of the paper, about 0.7 wt % to about 2.3 wt % of the vermiculite, about 1.3 wt % to about 3 wt % of the plurality of reinforcing fibers, about 7 wt % to about 10 wt % of the binding agent, about 2 wt % to about 4 wt % of the perlite, about 65 wt % to about 75 wt % of the calcium sulfate, and less than 2 wt % of any free water, wherein all weight percent values are based on a combined weight of the starch, paper, vermiculite, plurality of reinforcing fibers, binding agent, perlite, calcium sulfate and any free water.

14. The process of claim 12, wherein the aqueous mixture is cured by drying the aqueous mixture at a temperature of about 100° C. to about 315° C. for a time period of about 10 minutes to about 24 hours, and wherein the gypsum based composition is in a form of a panel having a thickness of about 3.5 cm to about 4.5 cm, a length of about 2 m to about 3 m, and a width of about 60 cm to about 125 cm.

15. The process of claim 12, wherein the gypsum based composition has a density of about 0.7 g/cm³ to about 1 g/cm³, as measured according to ASTM D1037-12.

16. The process of claim 12, wherein the gypsum based composition is in a form of a panel and has at least one property selected from the group consisting of: a minimum face screw holding strength of at least 2,450 N, a minimum hinge-loading of 2,450 N, a minimum vertical door edge screw holding of 2,450 N, and a minimum horizontal door edge screw holding of 1,330 N, wherein all properties are measured according to WDMA T.M. 10-14.

17. The process of claim 12, wherein the gypsum based composition, without blocking, is rated for use in an extra heavy duty classed fire door, as determined according to WDMA I.S. 1-A-14, and wherein the extra heavy duty classed fire door is rated for at least 90 minutes, as measured according to UL 10C (2009).

18. A laminated structure, comprising:
a first facing layer;
a second facing layer; and
a core disposed between the first facing layer and the second facing layer, wherein the core comprises a gypsum based composition comprising:
about 1.5 wt % to about 3 wt % of a starch,
about 11 wt % to about 14 wt % of a paper,
about 0.7 wt % to about 2.3 wt % of vermiculite,
about 1.3 wt % to about 3 wt % of a plurality of reinforcing fibers,
about 7 wt % to about 10 wt % of a binding agent,
about 2 wt % to about 4 wt % of perlite, and
about 65 wt % to about 75 wt % of a calcium sulfate,
based on a combined weight of the starch, paper, vermiculite, plurality of reinforcing fibers, binding agent, perlite, and calcium sulfate.

19. The laminated structure according to claim 18, wherein the gypsum based building composition has a density of about 0.7 g/cm³ to about 1 g/cm³, as measured according to ASTM D1037-12, and at least one property selected from the group consisting of: a minimum face screw holding strength of at least 2,450 N, a minimum hinge-loading of 2,450 N, a minimum vertical door edge screw holding of 2,450 N, and a minimum horizontal door edge screw holding of 1,330 N, wherein all properties are measured according to WDMA T.M. 10-14.

20. The laminated structure of claim 18, wherein the laminated structure comprises a fire door without blocking that is rated for at least 90 minutes, as measured according to UL 10C (2009).

* * * * *